(12) United States Patent
Cui et al.

(10) Patent No.: US 12,531,727 B2
(45) Date of Patent: Jan. 20, 2026

(54) ADAPTATION METHOD AND APPARATUS FOR CAMERA DEVICE, AND INTERNET-OF-THINGS TERMINAL AND STORAGE MEDIUM

(71) Applicant: E Surfing IoT Co., Ltd, Jiangsu (CN)

(72) Inventors: Ruilin Cui, Jiangsu (CN); Yanxia Zhang, Jiangsu (CN); Xinyan Fang, Jiangsu (CN)

(73) Assignee: E Surfing IoT Co., Ltd, Nanjing (CN)

( * ) Notice: Subject to any disclaimer, the term of this patent is extended or adjusted under 35 U.S.C. 154(b) by 77 days.

(21) Appl. No.: 18/696,381

(22) PCT Filed: Dec. 24, 2021

(86) PCT No.: PCT/CN2021/141217
§ 371 (c)(1),
(2) Date: Mar. 28, 2024

(87) PCT Pub. No.: WO2023/050612
PCT Pub. Date: Apr. 6, 2023

(65) Prior Publication Data
US 2024/0396722 A1    Nov. 28, 2024

(30) Foreign Application Priority Data
Sep. 29, 2021 (CN) .......................... 202111149009.5

(51) Int. Cl.
*H04L 9/08* (2006.01)
*G06F 21/64* (2013.01)
(Continued)

(52) U.S. Cl.
CPC ............ *H04L 9/0866* (2013.01); *G06F 21/64* (2013.01); *H04L 9/0861* (2013.01);
(Continued)

(58) Field of Classification Search
CPC ....... H04L 9/08; H04L 9/0863; H04L 9/0866; H04L 9/32; H04L 63/04; H04L 63/0428;
(Continued)

(56) References Cited

U.S. PATENT DOCUMENTS 9,003,497 B2 * 4/2015 Bohli ...................... H04L 63/18
726/4
9,009,805 B1 * 4/2015 Kirkby ............... H04N 21/4622
709/224

(Continued)

FOREIGN PATENT DOCUMENTS

CN           105162772 A      12/2015

OTHER PUBLICATIONS

International Search Report of PCT Patent Application No. PCT/CN2021/141217 issued on Jun. 27, 2022.

*Primary Examiner* — Shaqueal D Wade-Wright

(57) ABSTRACT

The present application relates to the technical field of video monitoring. Disclosed are an adaptation method and apparatus for a camera device, and an Internet-of-Things terminal and a storage medium. The method comprises: acquiring basic information of a camera device; on the basis of the basic information, generating configuration information corresponding to a monitoring system; binding the configuration information and the basic information by means of the monitoring system, such that the monitoring system identifies the camera device; and using the basic information as a secret key to encrypt the configuration information, so as to obtain a ciphertext combination, and sending the ciphertext combination to the camera device, such that the camera device decrypts the ciphertext combination on the basis of the basic information, thereby adapting the camera device to the monitoring system.

20 Claims, 3 Drawing Sheets

(51) Int. Cl.
*H04L 9/40* (2022.01)
*H04W 12/48* (2021.01)

(52) U.S. Cl.
CPC ........ *H04L 9/0863* (2013.01); *H04L 63/0428* (2013.01); *H04W 12/48* (2021.01)

(58) Field of Classification Search
CPC .... G06F 21/602; G06F 21/6218; G06F 21/64; H04W 12/48; H04W 12/40; H04W 12/60; H04W 12/65
See application file for complete search history.

(56) References Cited

U.S. PATENT DOCUMENTS

| | | | | |
|---|---|---|---|---|
| 2012/0095922 | A1* | 4/2012 | Wada | G06Q 30/0601 705/26.1 |
| 2019/0356480 | A1* | 11/2019 | Hyun | H04L 9/14 |
| 2020/0193787 | A1* | 6/2020 | Jolivet | G08B 13/19656 |
| 2024/0007523 | A1* | 1/2024 | Saxena | H04L 9/14 |

* cited by examiner

ADAPTATION METHOD AND APPARATUS FOR CAMERA DEVICE, AND INTERNET-OF-THINGS TERMINAL AND STORAGE MEDIUM

This application is based on and claims priority to Chinese patent application No. 202111149009.5, filed on Sep. 29, 2021, the whole content of which is incorporated into this application herein in its entirety.

TECHNICAL FIELD

The present application relates to the technical field of video monitoring, and particularly relates to an adaptation method and apparatus for a camera device, and an Internet-of-Things terminal and a storage medium.

BACKGROUND

After a camera is successfully adapted to a video monitoring system, the camera may be connected to the video monitoring system, so as to facilitate real-time preview and video retrieval on a mobile phone client and a computer client, and achieve remote monitoring anytime and anywhere.

According to an existing adaptation method for the camera and the video monitoring system, the camera is connected to a network via a network cable and then configuration is completed, the network is set to be effective, and then the camera is accessed to a video monitoring platform. However, in this mode, the camera is required to be directly adapted to the video monitoring system by setting the network, thereby causing information of the camera and the video monitoring system to be likely to leak, and resulting in relatively low security. There is an urgent need for a method for improving adaptation security of a camera device.

SUMMARY

An object of an example of the present application is to provide an adaptation method and apparatus for a camera device, and an Internet-of-Things terminal and a storage medium, so as to improve adaptation security of the camera device.

In order to solve the technical problem above, an example of the present application provides an adaptation method for a camera device, applied to a monitoring system, including:
  acquiring basic information of the camera device, wherein the basic information includes a device serial number and a device password;
  on the basis of the basic information, generating configuration information corresponding to the monitoring system;
  binding the configuration information and the basic information by means of the monitoring system, such that the monitoring system identifies the camera device; and
  using the basic information as a secret key to encrypt the configuration information, so as to obtain a ciphertext combination, and sending the ciphertext combination to the camera device, such that the camera device decrypts the ciphertext combination on the basis of the basic information, thereby adapting the camera device to the monitoring system.

In order to solve the technical problem above, an example of the present application provides an adaptation apparatus for a camera device, applied to a monitoring system, including:
  a basic information identification module configured to acquire basic information of the camera device, wherein the basic information includes a device serial number and a device password;
  a configuration information generation module configured to generate configuration information corresponding to the monitoring system on the basis of the basic information;
  a camera device identification module configured to bind the configuration information and the basic information by means of the monitoring system, such that the monitoring system identifies the camera device; and
  a camera device adaptation module configured to use the basic information as a secret key to encrypt the configuration information, so as to obtain a ciphertext combination, and send the ciphertext combination to the camera device, such that the camera device decrypts the ciphertext combination on the basis of the basic information, thereby adapting the camera device to the monitoring system.

In order to solve the technical problem above, a technical solution adopted by the present disclosure is to provide an Internet-of-Things terminal, including one or more processors; and a memory for storing one or more programs, and causing the one or more processors to implement the adaptation method for a camera device according to any one of the above.

In order to solve the technical problem above, a technical solution adopted by the present disclosure is to provide a computer-readable storage medium, wherein a computer program is stored on the computer-readable storage medium, and the computer program, when executed by a processor, implements the adaptation method for a camera device according to any one of the above.

The examples of the present application provide the adaptation method and apparatus for the camera device, and the Internet-of-Things terminal and the storage medium. By acquiring basic information of the camera device; on the basis of the basic information, generating configuration information corresponding to the monitoring system; binding the configuration information and the basic information by means of the monitoring system, such that the monitoring system identifies the camera device; and using the basic information as a secret key to encrypt the configuration information, so as to obtain a ciphertext combination, and sending the ciphertext combination to the camera device, such that the camera device decrypts the ciphertext combination on the basis of the basic information, thereby adapting the camera device to the monitoring system, the basic information of the camera device is used as the secret key to encrypt the configuration information generated by the monitoring system, and the encrypted configuration information is returned to the camera device for decryption, so as to encrypt and protect the information of the camera device and the monitoring system, thereby facilitating the improvement in the adaptation security of the camera device.

BRIEF DESCRIPTION OF THE DRAWINGS

In order to explain the solution in the present application more clearly, a brief description of the accompanying drawings which need to be used in the description of examples of the present application will be given below. Obviously, the accompanying drawings in the description below are intended for some examples of the present application, and for those ordinarily skilled in the art, other accompanying drawings may be obtained according to these accompanying drawings without involving any inventive effort.

DETAILED DESCRIPTION

Unless defined otherwise, all technical and scientific terms used herein have the same meaning as commonly understood by those ordinarily skilled in the art to which the present application belongs; the terms used herein in the description of the present application are for the purpose of describing particular examples only and are not intended for limiting the present application; and the terms "including" and "having" as well as any variation thereof in the description and claims of the present application and in the preceding description of the accompanying drawings are intended to cover a non-exclusive inclusion. The terms "first", "second", and the like in the description and claims of the present application or in the accompanying drawings above are used for distinguishing different objects and not used for describing a particular sequence.

Reference to "example" herein means that a particular feature, structure, or characteristic described in connection with the example may be included in at least one example of the present application. The appearance of the phrase in various places in the description not necessarily refers to the same example, and the example is not a separate or alternative example mutually exclusive of other examples. It is to be expressly and implicitly understood by those skilled in the art that the examples described herein may be combined with other examples.

In order to enable those skilled in the art to better understand the solutions of the present application, the technical solutions in the examples of the present application will be described clearly and completely below with reference to the accompanying drawings.

It should be noted that an adaptation method for a camera device provided by an example of the present application is generally executed by a server configured with a monitoring system, and accordingly, an adaptation apparatus for the camera device is generally configured in the server.

Figure 1:
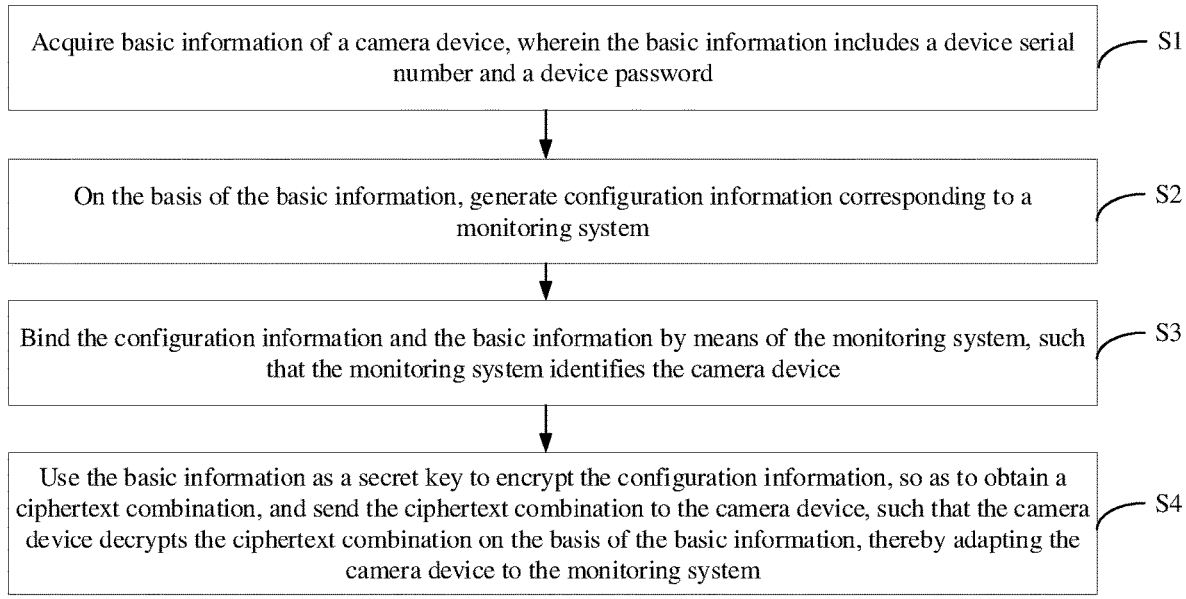
FIG. 1 is an implementation flowchart of an adaptation method for a camera device provided by an example of the present application.

Referring to FIG. 1, FIG. 1 shows an embodiment of a data transmission control method.

It should be noted that if substantially the same results are obtained, the method of the present application is not limited to a process sequence shown in FIG. 1, and the method includes the following steps.

S1: Basic information of the camera device is acquired, wherein the basic information includes a device serial number and a device password.

In an example of the present application, in order to understand the technical solution more clearly, terminals involved in the present application will be described in detail below.

The first terminal is a server configured with a monitoring system. The basic information of the camera device is acquired, and configuration information corresponding to the monitoring system is generated on the basis of the basic information; and the monitoring system may encrypt the configuration information and send the encrypted configuration information to the camera device, and the monitoring system may also receive adaptation result information fed back by the camera device.

The second terminal is the camera device. The camera device may receive the encrypted configuration information sent by the monitoring system, decrypt the configuration information, and identify and bind the decoded configuration information to achieve adaptation to the monitoring system; and the camera device may also feed back the adaptation result information to the monitoring system.

The third terminal is a user terminal. The user terminal is installed with an application corresponding to the monitoring system, and the user terminal may scan a two-dimensional code on the camera device, acquire the basic information of the camera device, and upload the basic information to the monitoring system.

Specifically, the monitoring system, the camera device, and the user terminal are combined to form an Internet-of-Things platform. Each camera device has a corresponding two-dimensional code thereon, and the two-dimensional code contains the basic information of the camera device. The basic information is the device serial number and the device password of the camera device. The user terminal scans and identifies the two-dimensional code of the camera device by accessing to a 5G/4G network, so as to acquire the basic information of the camera device, and upload the basic information to the monitoring system, such that the monitoring system acquires the basic information.

The serial number of the device is SN (abbreviation of Serial Number), and a unique identification code is generated according to software and hardware information of a computer installed by user software during registration of a user. The device serial number in this example is the unique identification code of the camera device.

S2: On the basis of the basic information, configuration information corresponding to the monitoring system is generated.

Specifically, the configuration information includes an IP address and port information of the monitoring system, a unique code, and a monitoring system password, wherein the unique code is combined by an area code where the monitoring system is located and a sequence number of the camera device.

Figure 2:
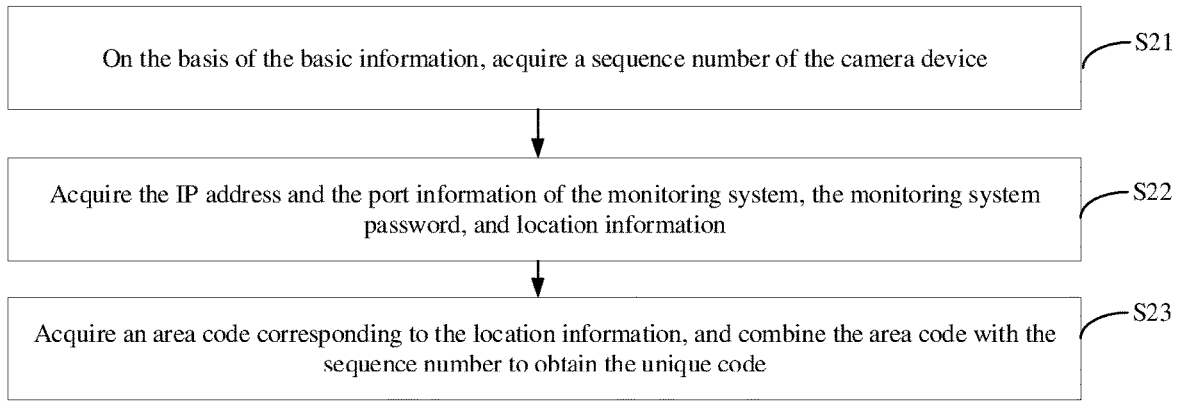
FIG. 2 is an implementation flowchart of a sub-process in the adaptation method for the camera device provided by an example of the present application.

Referring to FIG. 2, FIG. 2 shows an embodiment of step S2, which is described in detail below.

S21: On the basis of the basic information, a sequence number of the camera device is acquired.

Specifically, the camera devices are sequentially numbered by a sequence of acquiring the basic information of the camera devices. For example, if an identification sequence of the camera devices by the monitoring system is a camera device 1, a camera device 2, and a camera device 3, the sequence number corresponding to the camera device 1 is 001, the sequence number corresponding to the camera device 2 is 002, and the sequence number corresponding to the camera device 3 is 003.

S22: The IP address and the port information of the monitoring system, the monitoring system password, and location information are acquired.

Specifically, the IP address and the port information of the monitoring system are fixed information of the monitoring system, the monitoring system password is a password set in advance, and the location information is current location information of the monitoring system.

S23: An area code corresponding to the location information is acquired, and the area code is combined with the sequence number to obtain the unique code.

Specifically, the area code is obtained through the location information, the area code is an area number, and then the area code is combined with the sequence number to obtain the unique code.

In this example, by acquiring the sequence number of the camera device on the basis of the basic information, acquiring the IP address and the port information of the monitoring system, the monitoring system password, and the location information, then acquiring the area code corresponding to the location information, and combining the area code with the sequence number to obtain the unique code, binding the camera device and the monitoring system is facilitated, so as to facilitate sending the configuration information to the camera device for adaptation subsequently, and improving adaptation efficiency.

S3: The configuration information and the basic information are bound by means of the monitoring system, such that the monitoring system identifies the camera device.

Specifically, the configuration information and the basic information are combined, and then the combined information is bound by means of the monitoring system, such that the monitoring system identifies the corresponding camera device, and the monitoring system is successfully adapted to the camera device after the camera device is successfully matched with the configuration information subsequently.

Figure 3:
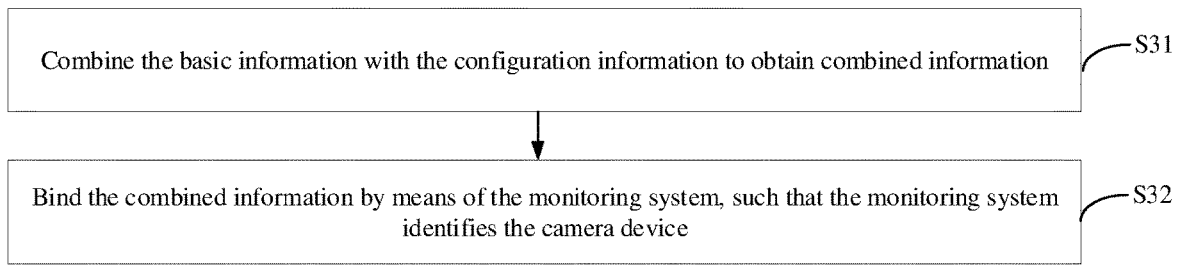
FIG. 3 is another implementation flowchart of a sub-process in the adaptation method for the camera device provided by an example of the present application.

Referring to FIG. 3, FIG. 3 shows an embodiment of step S3, which is described in detail below.

S31: The basic information is combined with the configuration information to obtain combined information.

S32: The combined information is bound by means of the monitoring system, such that the monitoring system identifies the camera device.

Specifically, being bound, also known as binding, allows operation supported by an object to be invoked, so as to place the object in a running state. The object may be bound during running, which is called late binding or dynamic binding, and may also be bound during compiling, which is called static binding. In this example, the combined information is bound by means of the monitoring system, such that the monitoring system identifies the camera device.

S4: The basic information is used as a secret key to encrypt the configuration information, so as to obtain a ciphertext combination, and the ciphertext combination is sent to the camera device, such that the camera device decrypts the ciphertext combination on the basis of the basic information, thereby adapting the camera device to the monitoring system.

Specifically, as the monitoring system acquires the basic information of the camera device, and the camera device may store the basic information itself, the basic information is used as the secret key to encrypt the configuration information, so as to obtain ciphertext information, and then the ciphertext combination is sent to the camera device, such that the camera device encrypts the ciphertext combination on the basis of the basic information subsequently to obtain the configuration information.

Specifically, after the camera device receives the ciphertext combination, the basic information of the camera device itself is used as the secret key to encrypt the ciphertext combination to obtain the configuration information; and then the camera device is matched with the configuration information, if the matching is successful, successful matching information is fed back to the monitoring system, and after the monitoring system receives the successful matching information, a picture of successful adaptation of the camera device is displayed by means of the monitoring system, thereby successfully adapted the camera device to the monitoring system.

In this example, by acquiring the basic information of the camera device; generating the configuration information corresponding to the monitoring system on the basis of the basic information; binding the configuration information and the basic information by means of the monitoring system, such that the monitoring system identifies the camera device; and using the basic information as the secret key to encrypt the configuration information, so as to obtain the ciphertext combination, and sending the ciphertext combination to the camera device, such that the camera device decrypts the ciphertext combination on the basis of the basic information, thereby adapting the camera device to the monitoring system, the basic information of the camera device is used as the secret key to encrypt the configuration information generated by the monitoring system, and the encrypted configuration information is returned to the camera device for decryption, so as to encrypt and protect the information of the camera device and the monitoring system, thereby facilitating the improvement in the adaptation security of the camera device.

Figure 4:
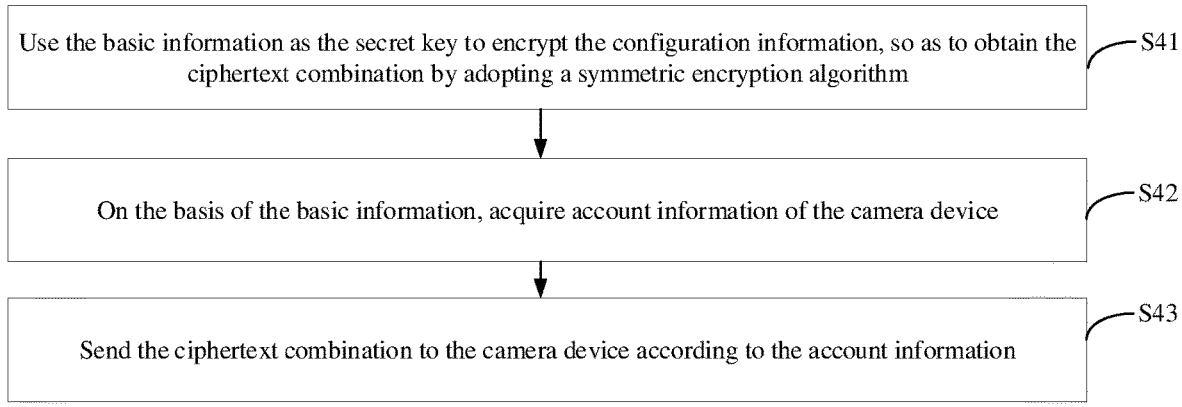
FIG. 4 is still another implementation flowchart of a sub-process in the adaptation method for the camera device provided by an example of the present application.

Referring to FIG. 4, FIG. 4 shows an embodiment of step S4, which is described in detail below.

S41: The basic information is used as the secret key to encrypt the configuration information, so as to obtain the ciphertext combination by adopting a symmetric encryption algorithm.

Specifically, the symmetric encryption algorithm adopted by the present application is an AES symmetric encryption algorithm, and the AES symmetric encryption algorithm uses the same secret key for both encryption and decryption. In AES encryption, a file is segmented into a plurality of small blocks of 128 bits, namely 16 bytes. If the file size is not an integer multiple of 16 bytes, some data is added at the end to make up the integer multiple, and each block is encrypted separately. In encryption, the AES algorithm has two inputs and one output. The input is the secret key and file content, and the output is ciphertext; and in decryption, the ciphertext and the secret key are input, and the output is original text of the file. In this example, the basic information is used as the secret key to encrypt the configuration information, so as to obtain the ciphertext combination by adopting the symmetric encryption algorithm.

S42: On the basis of the basic information, account information of the camera device is acquired.

S43: The ciphertext combination is sent to the camera device according to the account information.

Specifically, each camera device has the account information corresponding to the camera device, and the monitoring system acquires the account information and sends the ciphertext combination to the camera device by ways of sending a short message/Wechat message, and the like.

In this example, by using the basic information as the secret key to encrypt the configuration information, so as to obtain the ciphertext combination by adopting the symmetric encryption algorithm; on the basis of the basic information, acquiring the account information of the camera device; and sending the ciphertext combination to the camera device according to the account information, the configuration information is encrypted, so as to improve the adaptation security of the camera device.

Figure 5:
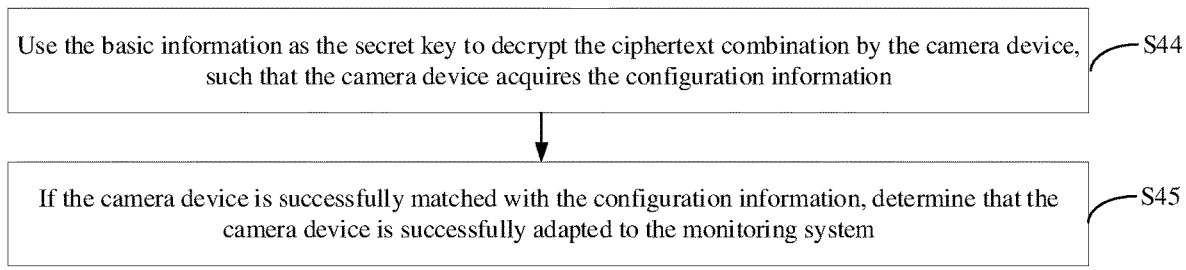
FIG. 5 is still another implementation flowchart of a sub-process in the adaptation method for the camera device provided by an example of the present application.

Referring to FIG. 5, FIG. 5 shows another embodiment of step S4, which is described in detail below.

S45: The basic information is used as the secret key to decrypt the ciphertext combination by the camera device, such that the camera device acquires the configuration information.

S46: If the camera device is successfully matched with the configuration information, it is determined that the camera device is successfully adapted to the monitoring system.

Specifically, as the configuration information is encrypted by adopting the symmetric encryption algorithm, after the camera device acquires the ciphertext combination, the basic information of the camera device itself is used as the secret key to decrypt the ciphertext combination to obtain the configuration information; and then the camera device is matched with the configuration information, if the matching is successful, it is indicated that the camera device is successfully adapted to the monitoring system.

In this example, by using the basic information as the secret key to decrypt the ciphertext combination by the camera device, such that the camera device acquires the configuration information; and if the camera device is successfully matched with the configuration information, determining that the camera device is successfully adapted to the monitoring system, the basic information is used as the secret key to decrypt the ciphertext combination by the camera device, so as to improve the adaptation security of the camera device.

Figure 6:
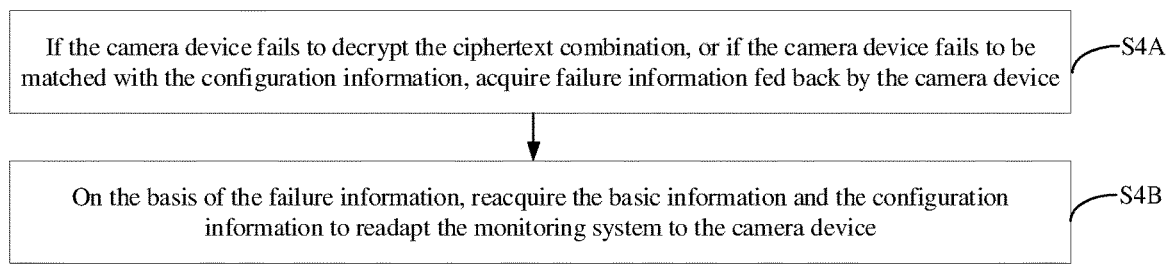
FIG. 6 is still another implementation flowchart of a sub-process in the adaptation method for the camera device provided by an example of the present application.

Referring to FIG. 6, FIG. 6 shows an embodiment after step S4, which is described in detail below.

S4A: If the camera device fails to decrypt the ciphertext combination, or if the camera device fails to be matched with the configuration information, failure information fed back by the camera device is acquired.

S4B: On the basis of the failure information, the basic information and the configuration information are reacquired to readapt the monitoring system to the camera device.

Specifically, if the camera device fails to decrypt the ciphertext combination, or if the camera device fails to be matched with the configuration information, failure of the adaptation of the camera device will be caused herein. If the adaptation fails, the camera device feeds back the failure information to the monitoring system, and after the monitoring system receives the failure information, the basic information and the configuration information are reacquired to readapt the monitoring system to the camera device, so as to ensure successful adaptation of the camera device.

Figure 7:
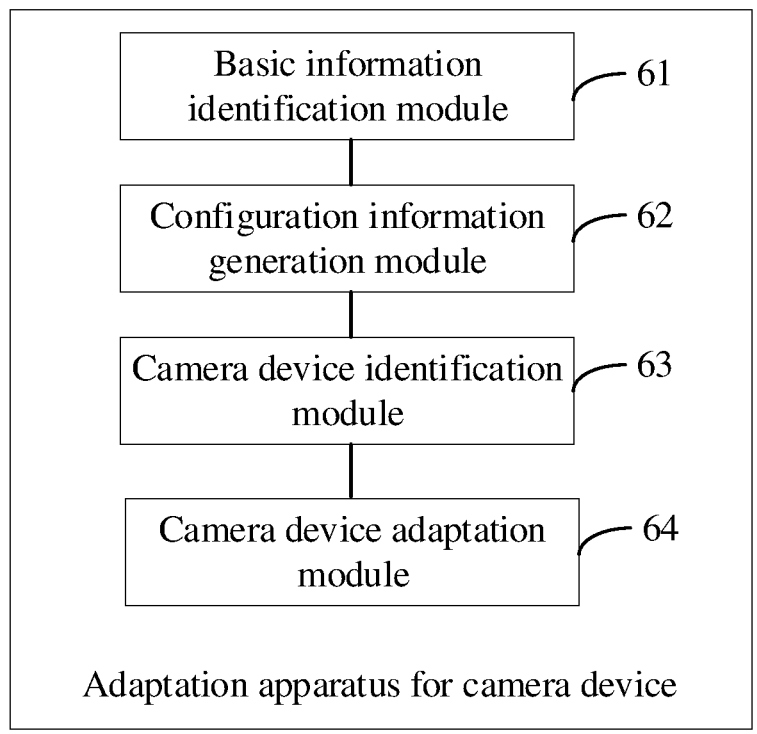
FIG. 7 is a schematic diagram of an adaptation apparatus for a camera device provided by an example of the present application.

Referring to FIG. 7, as an implementation of the method shown in FIG. 1 described above, the present application provides an example of an adaptation apparatus for a camera device, and the example of the apparatus corresponds to the example of the method shown in FIG. 1. The apparatus may be specifically applied in various monitoring systems.

As shown in FIG. 7, the adaptation apparatus for a camera device of this example includes: a basic information identification module 61, a configuration information generation module 62, a camera device identification module 63, and a camera device adaptation module 64, wherein:

the basic information identification module 61 is configured to acquire basic information of the camera device, wherein the basic information includes a device serial number and a device password;

the configuration information generation module 62 is configured to generate configuration information corresponding to the monitoring system on the basis of the basic information;

the camera device identification module 63 is configured to bind the configuration information and the basic information by means of the monitoring system, such that the monitoring system identifies the camera device; and the camera device adaptation module 64 is configured to use the basic information as a secret key to encrypt the configuration information, so as to obtain a ciphertext combination, and send the ciphertext combination to the camera device, such that the camera device decrypts the ciphertext combination on the basis of the basic information, thereby adapting the camera device to the monitoring system.

Further, the configuration information generation module 62 includes:

a sequence number acquisition unit configured to acquire a sequence number of the camera device on the basis of the basic information;

a monitoring system information acquisition unit configured to acquire the IP address and the port information of the monitoring system, the monitoring system password, and location information; and a unique code generation unit configured to acquire an area code corresponding to the location information, and combine the area code with the sequence number to obtain the unique code.

Further, the camera device identification module 63 includes:

a combined information generation unit configured to combine the basic information with the configuration information to obtain combined information; and an information binding unit configured to bind the combined information by means of the monitoring system, such that the monitoring system identifies the camera device.

Further, the camera device adaptation module 64 includes:

a ciphertext combination generation unit configured to use the basic information as the secret key to encrypt the configuration information, so as to obtain the ciphertext combination by adopting a symmetric encryption algorithm;

an account information acquisition unit configured to acquire account information of the camera device on the basis of the basic information; and a ciphertext sending unit configured to send the ciphertext combination to the camera device according to the account information.

Further, the camera device adaptation module 64 further includes:

a ciphertext combination decryption unit configured to use the basic information as the secret key to decrypt the ciphertext combination by the camera device, such that the camera device acquires the configuration information; and a configuration information matching unit configured to determine that the camera device is successfully adapted to the monitoring system if the camera device is successfully matched with the configuration information.

Further, after the camera device adaptation module 64, the apparatus further includes:

a failure information acquisition module configured to acquire failure information fed back by the camera device if the camera device fails to decrypt the ciphertext combination, or if the camera device fails to be matched with the configuration information; and a readaptation module configured to reacquire the basic information and the configuration information on the basis of the failure information to readapt the monitoring system to the camera device.

Further, the basic information identification module 61 includes:

a two-dimensional code scanning unit configured to scan a two-dimensional code of the camera device by means of a user terminal to acquire the basic information.

Figure 8:
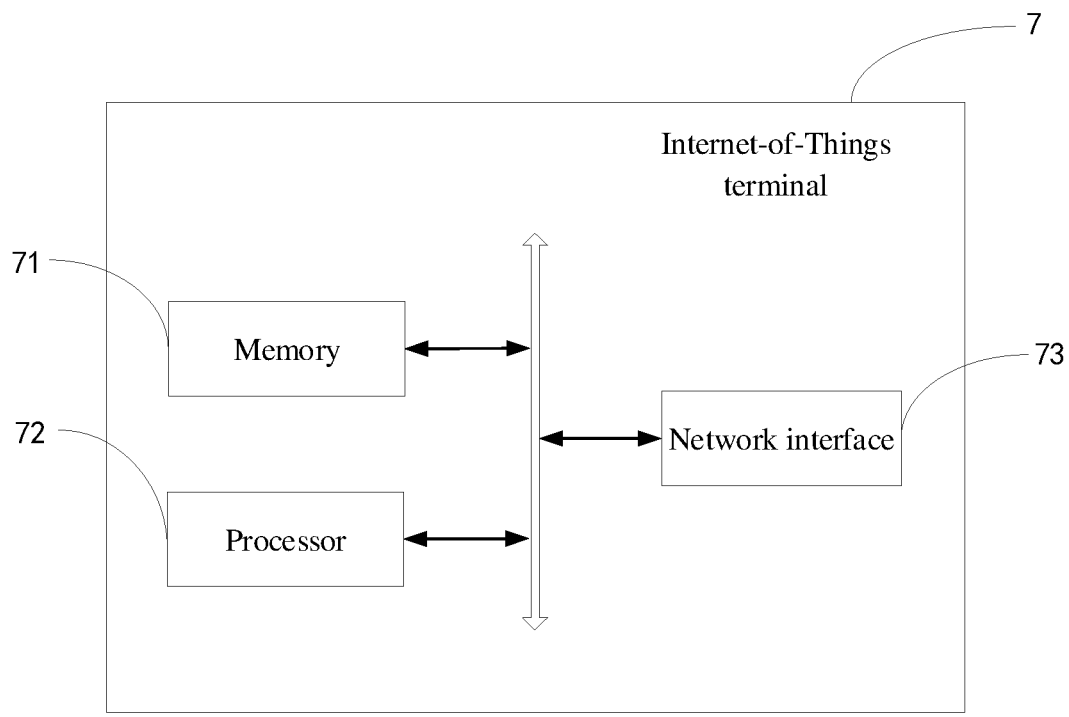
FIG. 8 is a schematic diagram of an Internet-of-Things terminal provided by an example of the present application.

In order to solve the technical problem above, an example of the present application further provides an Internet-of-Things terminal. Specifically referring to FIG. 8, FIG. 8 is a block diagram of a basic structure of the Internet-of-Things terminal of this example.

The Internet-of-Things terminal 7 includes a memory 71, a processor 72, and a network interface 73 which are communicatively connected to one another through system buses. It should be noted that only the Internet-of-Things terminal 7 having three components, namely the memory 71, the processor 72, and the network interface 73 is shown in the figure, but it should be understood that not all the shown components are required to be implemented, and more or less components may be implemented instead.

The memory 71 includes at least one type of readable storage medium including a flash memory, a hard disk, a multi-media card, a card-type memory (for example, an SD or DX memory, and the like), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disk, and the like. In some examples, the memory 71 may be an internal storage unit of the Internet-of-Things terminal 7, such as a hard disk or a memory of the Internet-of-Things terminal 7. In other examples, the memory 71 may also be an external storage device of the Internet-of-Things terminal 7, such as a plug-in hard disk, a smart media card (SMC), a secure digital (SD) card, a flash card, and the like provided on the Internet-of-Things terminal 7. Of course, the memory 71 may also include both the internal storage unit and the external storage device of the Internet-of-Things terminal 7. In this example, the memory 71 is generally used for storing an operating system and various types of application software which are installed at the Internet-of-Things terminal 7, such as program codes of the adaptation method for the camera device, and the like. In addition, the memory 71 may be used for temporarily storing various types of data which have been output or will be output.

The processor 72 may be a central processing unit (CPU), a controller, a microcontroller, a microprocessor, or other data processing chips in some examples. The processor 72 is generally used for controlling the overall operation of the Internet-of-Things terminal 7. In this example, the processor 72 is used for running the program code stored in the memory 71 or processing data, for example, running the program code of the adaptation method for the camera device described above, so as to implement various examples of the adaptation method for the camera device.

The network interface 73 may include a wireless network interface or a wired network interface, and the network interface 73 is generally used for establishing communication connection between the Internet-of-Things terminal 7 and other Internet-of-Things terminals.

The present application further provides another embodiment, namely provides a computer-readable storage medium, wherein a computer program is stored on the computer-readable storage medium, and the computer program may be executed by at least one processor to cause the at least one processor to execute steps of the adaptation method for the camera device as described above.

Through the description of the embodiments above, it will be clear to those skilled in the art that the method of the examples described above may be implemented by means of software plus a necessary general hardware platform, of course may also be implemented by means of hardware, but in many cases the former is a preferred embodiment. Based on such an understanding, the technical solution of the present application, either substantively or in any way contributing to the prior art, may be embodied in the form of a software product, wherein the computer software product is stored in a storage medium (such as ROM/RAM, a magnetic diskette, and an optical disk), and includes a plurality of instructions for causing a terminal device (which may be a mobile phone, a computer, a server, an air conditioner, or a network device, and the like) to execute the method of various examples of the present application.

Obviously, the examples described above are merely some, but not all, examples of the present application, and the accompanying drawings illustrate the preferred examples of the present application, but do not limit the patent scope of the present application. The present application may be implemented in many different forms, and on the contrary, these examples are provided such that the disclosed content of the present application will be understood more thoroughly and completely. Although the present application has been described in detail with reference to the examples described above, those skilled in the art will be able to make modifications to the technical solutions disclosed in the embodiments described above or make equivalent substitutions for some of the technical features. Any equivalent structures made by using the content of the description and the accompanying drawings of the present application, whether directly or indirectly applied in other relevant technical fields, likewise fall within the protection scope of the present application.

What is claimed is:

1. An adaptation method for a camera device, applied to a monitoring system, comprising:

acquiring basic information of the camera device, wherein the basic information comprises a device serial number and a device password;

on the basis of the basic information, generating configuration information corresponding to the monitoring system;

binding the configuration information and the basic information by means of the monitoring system, such that the monitoring system identifies the camera device; and using the basic information as a secret key to encrypt the configuration information, so as to obtain a ciphertext combination, and sending the ciphertext combination to the camera device, such that the camera device decrypts the ciphertext combination on the basis of the basic information, thereby adapting the camera device to the monitoring system.

2. The adaptation method for a camera device according to claim 1, wherein the configuration information comprises an Internet Protocol address and port information of the monitoring system, a unique code, and a monitoring system password, and the on the basis of the basic information, generating configuration information corresponding to the monitoring system comprises:
on the basis of the basic information, acquiring a sequence number of the camera device;
acquiring the Internet Protocol address and the port information of the monitoring system, the monitoring system password, and location information; and
acquiring an area code corresponding to the location information, and combining the area code with the sequence number to obtain the unique code.

3. The adaptation method for a camera device according to claim 1, wherein the binding the configuration information and the basic information by means of the monitoring system, such that the monitoring system identifies the camera device comprises:
combining the basic information with the configuration information to obtain combined information; and
binding the combined information by means of the monitoring system, such that the monitoring system identifies the camera device.

4. The adaptation method for a camera device according to claim 1, wherein the using the basic information as a secret key to encrypt the configuration information, so as to obtain a ciphertext combination, and sending the ciphertext combination to the camera device comprises:
using the basic information as the secret key to encrypt the configuration information, so as to obtain the ciphertext combination by adopting a symmetric encryption algorithm;
on the basis of the basic information, acquiring account information of the camera device; and
sending the ciphertext combination to the camera device according to the account information.

5. The adaptation method for a camera device according to claim 1, wherein the camera device decrypts the ciphertext combination on the basis of the basic information, thereby adapting the camera device to the monitoring system comprises:
using the basic information as the secret key to decrypt the ciphertext combination by the camera device, such that the camera device acquires the configuration information; and
if the camera device is successfully matched with the configuration information, determining that the camera device is successfully adapted to the monitoring system.

6. The adaptation method for a camera device according to claim 1, wherein after using the basic information as the secret key to decrypt the ciphertext combination by the camera device, such that the camera device acquires the configuration information, the method further comprises:
if the camera device fails to decrypt the ciphertext combination, or if the camera device fails to be matched with the configuration information, acquiring failure information fed back by the camera device; and
on the basis of the failure information, reacquiring the basic information and the configuration information to readapt the monitoring system to the camera device.

7. The adaptation method for a camera device according to claim 1, wherein the acquiring basic information of a camera device comprises:
scanning a two-dimensional code of the camera device by means of a user terminal to acquire the basic information.

8. An Internet-of-Things terminal, comprising a memory and a processor, wherein a computer program is stored in the memory, and the processor, when executing the computer program, implements the following steps:
acquiring basic information of a camera device, wherein the basic information comprises a device serial number and a device password;
on the basis of the basic information, generating configuration information corresponding to a monitoring system;
binding the configuration information and the basic information by means of the monitoring system, such that the monitoring system identifies the camera device; and
using the basic information as a secret key to encrypt the configuration information, so as to obtain a ciphertext combination, and sending the ciphertext combination to the camera device, such that the camera device decrypts the ciphertext combination on the basis of the basic information, thereby adapting the camera device to the monitoring system.

9. The Internet-of-Things terminal according to claim 8, wherein the configuration information comprises an Internet Protocol address and port information of the monitoring system, a unique code, and a monitoring system password, and the on the basis of the basic information, generating configuration information corresponding to the monitoring system comprises:
on the basis of the basic information, acquiring a sequence number of the camera device;
acquiring the Internet Protocol address and the port information of the monitoring system, the monitoring system password, and location information; and
acquiring an area code corresponding to the location information, and combining the area code with the sequence number to obtain the unique code.

10. The Internet-of-Things terminal according to claim 8, wherein the binding the configuration information and the basic information by means of the monitoring system, such that the monitoring system identifies the camera device comprises:
combining the basic information with the configuration information to obtain combined information; and
binding the combined information by means of the monitoring system, such that the monitoring system identifies the camera device.

11. The Internet-of-Things terminal according to claim 8, wherein the using the basic information as a secret key to encrypt the configuration information, so as to obtain a ciphertext combination, and sending the ciphertext combination to the camera device comprises:
using the basic information as the secret key to encrypt the configuration information, so as to obtain the ciphertext combination by adopting a symmetric encryption algorithm;
on the basis of the basic information, acquiring account information of the camera device; and
sending the ciphertext combination to the camera device according to the account information.

12. The Internet-of-Things terminal according to claim 8, wherein the camera device decrypts the ciphertext combination on the basis of the basic information, thereby adapting the camera device to the monitoring system comprises:
 using the basic information as the secret key to decrypt the ciphertext combination by the camera device, such that the camera device acquires the configuration information; and
 if the camera device is successfully matched with the configuration information, determining that the camera device is successfully adapted to the monitoring system.

13. The Internet-of-Things terminal according to claim 8, wherein after using the basic information as the secret key to decrypt the ciphertext combination by the camera device, such that the camera device acquires the configuration information, the method further comprises:
 if the camera device fails to decrypt the ciphertext combination, or if the camera device fails to be matched with the configuration information, acquiring failure information fed back by the camera device; and
 on the basis of the failure information, reacquiring the basic information and the configuration information to readapt the monitoring system to the camera device.

14. The Internet-of-Things terminal according to claim 8, wherein the acquiring basic information of a camera device comprises:
 scanning a two-dimensional code of the camera device by means of a user terminal to acquire the basic information.

15. A non-transitory computer-readable storage medium, wherein a computer program is stored on the computer-readable storage medium, and the computer program, when executed by a processor, implements the following steps:
 acquiring basic information of a camera device, wherein the basic information comprises a device serial number and a device password;
 on the basis of the basic information, generating configuration information corresponding to a monitoring system;
 binding the configuration information and the basic information by means of the monitoring system, such that the monitoring system identifies the camera device; and
 using the basic information as a secret key to encrypt the configuration information, so as to obtain a ciphertext combination, and sending the ciphertext combination to the camera device, such that the camera device decrypts the ciphertext combination on the basis of the basic information, thereby adapting the camera device to the monitoring system.

16. The non-transitory computer-readable storage medium according to claim 15, wherein the configuration information comprises an Internet Protocol address and port information of the monitoring system, a unique code, and a monitoring system password, and the on the basis of the basic information, generating configuration information corresponding to the monitoring system comprises:
 on the basis of the basic information, acquiring a sequence number of the camera device;
 acquiring the Internet Protocol address and the port information of the monitoring system, the monitoring system password, and location information; and
 acquiring an area code corresponding to the location information, and combining the area code with the sequence number to obtain the unique code.

17. The non-transitory computer-readable storage medium according to claim 15, wherein the binding the configuration information and the basic information by means of the monitoring system, such that the monitoring system identifies the camera device comprises:
 combining the basic information with the configuration information to obtain combined information; and
 binding the combined information by means of the monitoring system, such that the monitoring system identifies the camera device.

18. The non-transitory computer-readable storage medium according to claim 15, wherein the using the basic information as a secret key to encrypt the configuration information, so as to obtain a ciphertext combination, and sending the ciphertext combination to the camera device comprises:
 using the basic information as the secret key to encrypt the configuration information, so as to obtain the ciphertext combination by adopting a symmetric encryption algorithm;
 on the basis of the basic information, acquiring account information of the camera device; and
 sending the ciphertext combination to the camera device according to the account information.

19. The non-transitory computer-readable storage medium according to claim 15, wherein the camera device decrypts the ciphertext combination on the basis of the basic information, thereby adapting the camera device to the monitoring system comprises:
 using the basic information as the secret key to decrypt the ciphertext combination by the camera device, such that the camera device acquires the configuration information; and
 if the camera device is successfully matched with the configuration information, determining that the camera device is successfully adapted to the monitoring system.

20. The non-transitory computer-readable storage medium according to claim 15, wherein after using the basic information as the secret key to decrypt the ciphertext combination by the camera device, such that the camera device acquires the configuration information, the method further comprises:
 if the camera device fails to decrypt the ciphertext combination, or if the camera device fails to be matched with the configuration information, acquiring failure information fed back by the camera device; and
 on the basis of the failure information, reacquiring the basic information and the configuration information to readapt the monitoring system to the camera device.

* * * * *